H. L. DOHERTY.
PROCESS FOR MANUFACTURING AMMONIUM CARBONATE AND SULFUR FROM CRUDE COAL GAS.
APPLICATION FILED FEB. 15, 1910.

1,043,212.

Patented Nov. 5, 1912.

Witnesses:
L. G. Coleman
Thos. J. Carter

Henry L. Doherty, Inventor
By his Attorney Frank S. Young

UNITED STATES PATENT OFFICE.

HENRY L. DOHERTY, OF NEW YORK, N. Y.

PROCESS FOR MANUFACTURING AMMONIUM CARBONATE AND SULFUR FROM CRUDE COAL-GAS.

1,043,212.   Specification of Letters Patent.   Patented Nov. 5, 1912.

Application filed February 15, 1910. Serial No. 544,096.

*To all whom it may concern:*

Be it known that I, HENRY L. DOHERTY, a citizen of the United States, and a resident of New York city, in the county of New York and State of New York, have invented certain new and useful Improvements in Processes for Manufacturing Ammonium Carbonate and Sulfur from Crude Coal-Gas, of which the following is a specification.

My invention relates to a process for manufacturing ammonium carbonate and sulfur from crude coal gas.

The object of my invention is to provide a process whereby the ammonia of the crude gas may be recovered as carbonate in combination with the $CO_2$ of the gas and the sulfur of the crude gas recovered in the free condition.

In the usual manner of fixing the ammonia formed in the distillation or gasification of coal, the ammonia-bearing gases are conducted through a suitable chamber in which they are contacted with separately manufactured sulfuric acid, fixing the ammonia as ammonium sulfate. This product is used as the source of ammonia for various industrial purposes but, chiefly, as a fertilizer. By my method, I am able to fix the ammonia in a form more readily available for industrial use, and which is equally available as a fertilizer, without the necessity of using any chemical reagents other than those obtained from the coal at the same time as the ammonia.

Briefly, my invention consists in absorbing the ammonia, carbon-dioxid, and hydrogen sulfid of the distillation gas in a partially purified ammonia liquor, containing a substantial proportion of its ammonia in the free or hydrated condition, separately separating the ammonia, on the one hand, and the carbon-dioxid and hydrogen sulfid, on the other from said liquor, passing the mixed acid gases through a bed of iron oxid, together with sufficient air to liberate the sulfur of the hydrogen sulfid as free sulfur, separating out the free sulfur from the residual gases, which contain the $CO_2$ unchanged, mixing the residual gases with the separated ammonia and recovering the ammonia carbonates formed.

In my co-pending applications Ser. Nos. 544,094 and 544,095, I have shown and claimed processes more or less closely allied to the one herein revealed.

In the accompanying drawings, I have shown, in diagrammatic form, an arrangement of apparatus suitable for applying my invention.

Fig. 3 is a diagrammatic elevation of the apparatus for separating the ammonia and the carbon dioxid and hydrogen sulfid from the scrubbing liquor and recovering the ammonium carbonate and free sulfur, therefrom. Fig. 4 is a detail of the still shown in Fig. 3. Fig. 5 is a section of the upper boiling compartment of the still. Fig. 6 is a vertical diametral section through the cooler and separator of the ammonium salts on the line A B of Fig. 7. Fig. 7 is a horizontal cross-section of the cooler-separator on the line C D of Fig. 6. Fig. 8 is a top view of the cooler-separator; while Fig. 9 shows a partial development on a vertical plane of one of the walls of the spiral partition of the cooler-separator with the baffles, which guide the flow of the cooling liquid, attached.

Figures 1, 2:
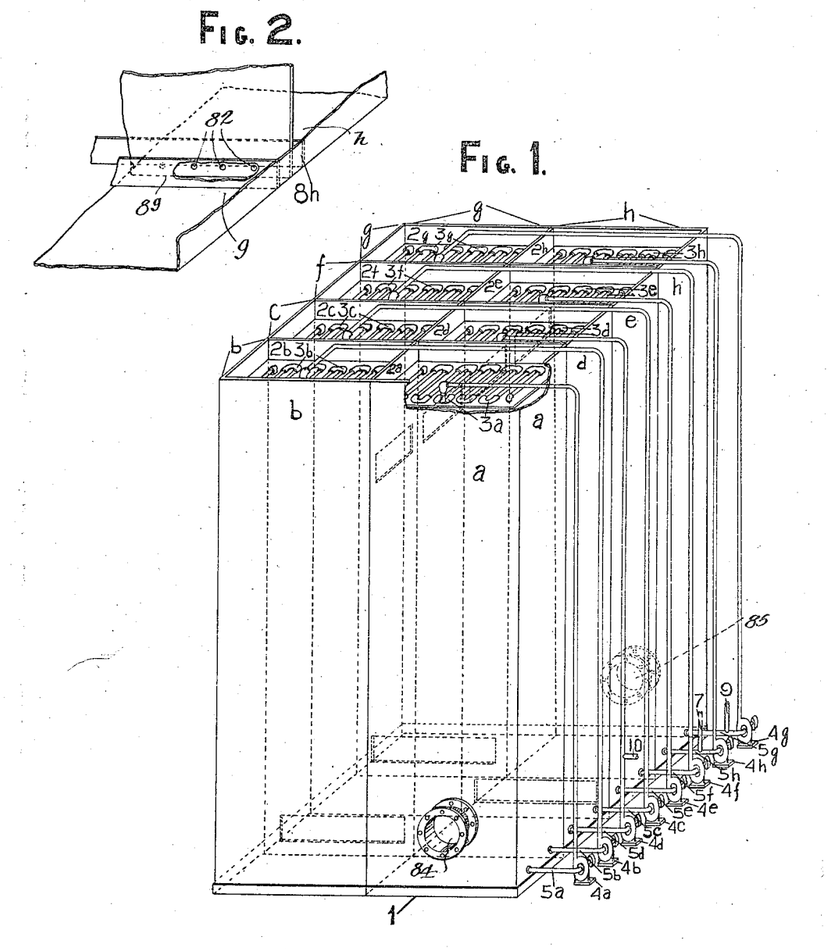
Figure 1 is a perspective view of the gas washing and cooling apparatus.
Fig. 2 is a detail of the same showing how the scrubbing liquor passes from compartment to compartment of said apparatus.

In the drawings, 1 is the absorption apparatus or gas washer. This is divided into a plurality of compartments, $a$, $b$, $c$, $d$, $e$, $f$, $g$, and $h$, in the design shown, each compartment having located above it a compartment ($2_a$, $2_b$, $2_c$, etc., respectively) in which is a cooling coil ($3_a$, $3_b$, etc.), through which the liquid used in the compartment to wash the gas is passed, for the purpose of cooling it, before introducing it into the washing compartment in contact with the gas. The cooling is performed, in the apparatus shown, by the circulation of a cooling liquid around the coils in the compartments 2. Circulating pumps, $4_a$, $4_b$, etc., maintain a constant circulation of liquid from the bottoms of the compartments to the respective cooling coils. The cooling coils may, of course, be of any type preferred—for instance, they may be of one of the well known forms of cooling coils used in refrigeration. After passing through the coils 3, the liquid passes through some suitable distributing device which should secure a uniform distribution of the liquid across the cross-section of the compartment. These compartments, a, b, c, etc., generally contain a structure of grids or trays over the surface of which the liquid finds its way to the bottoms of the compartments. The surface of the grids (or whatever form of filling is used) is thus kept continually wetted. The gas passes through the interstices of the grid structure and is thus brought into intimate contact with the scrubbing liquid. The gas enters through the gas inlet 84 and passes through all of the compartments a, b, c, d, etc., in series, finally discharging from compartment h through the outlet 85.

In compartment h, the gas, which here should contain only a trace of $NH_3$ and the acid gases $H_2S$ and $CO_2$, is subjected to scrubbing by a portion of previously formed ammonia liquor, which has been freed, in the manner hereinafter described, from substantially all of its volatilizable compounds. The extent to which it is necessary to remove the volatilizable gases from this portion of the liquor depends, in great measure, upon the temperature that prevails in h. While ammonia has a considerable affinity for water, even weak solutions of $NH_3$ in water possess an appreciable vapor tension at ordinary temperatures. It is necessary that the liquor used for scrubbing in h should have a vapor tension of its $NH_3$ less than the tension of the small quantity of $NH_3$ in the gas passing through compartment h. Usually, the final traces of $NH_3$ are removed from the gas by scrubbing with fresh water. By my method, however, I prefer to use the liquor that has been freed from its volatilizable ammonia in order to avoid the dilution of the liquor that is occasioned by the use of fresh water. The liquor in h is maintained in circulation by pump $4_h$ as already explained. A portion of this liquor, corresponding to the volume of fresh liquor introduced through pipe 7, overflows to compartment g through the sealing device shown in Fig. 2, and mixes with the liquor circulating in compartment g. This sealing device is formed by two baffles, $8_g$ and $8_h$ respectively, spaced some distance away from the vertical sheet separating the chambers. Near the bottom of this sheet are numerous apertures, 82. Normally, the level of the liquor in the chambers is maintained at a depth somewhat greater than the height of the baffles. As the liquor is withdrawn from the system (from compartment d as shown) the level in d tends to fall. This causes a flow of liquor from e to d through the apertures in the dividing wall, which in turn causes a flow from the next compartment, and so on. The liquor seals between the compartments are all similar to the one shown as connecting compartments g and h.

The liquor is introduced to g by the pipe 9 connected, in the arrangement shown, to the suction pipe $5_g$ of pump $4_g$, and is circulated in the manner described, a volume of liquor corresponding to the overflow from h and the quantity of purified liquor introduced through 9 (plus the condensation from the gas) overflows to compartment f. The liquor flows in this way from compartment to compartment, a volume being maintained in circulation in each compartment much greater than the volume of the flow from compartment to compartment. The volume of liquor supplied through the pipes 7 and 9 depends, in great measure, upon its content of ammonia. It is necessary to introduce in the liquor supplied by the pipe 9 the quantity of free ammonia that will suffice, in connection with the ammonia already present in the gas, to form sulfid and carbonate, respectively, with the $H_2S$ and $CO_2$ of the crude gas. When the proper quantity of free ammonia is supplied in the liquor substantially all of the $H_2S$, $CO_2$, and $NH_3$ may be removed from the crude gas. In my preferred method of working, I withdraw the liquor bearing the $H_2S$, $CO_2$, and $NH_3$ from compartment d through pipe 10 and run it to the ammonia-sulfur recovery plant. This is shown diagrammatically in Fig. 3.

Figures 3, 4, 5, 6, 7, 8, 9:
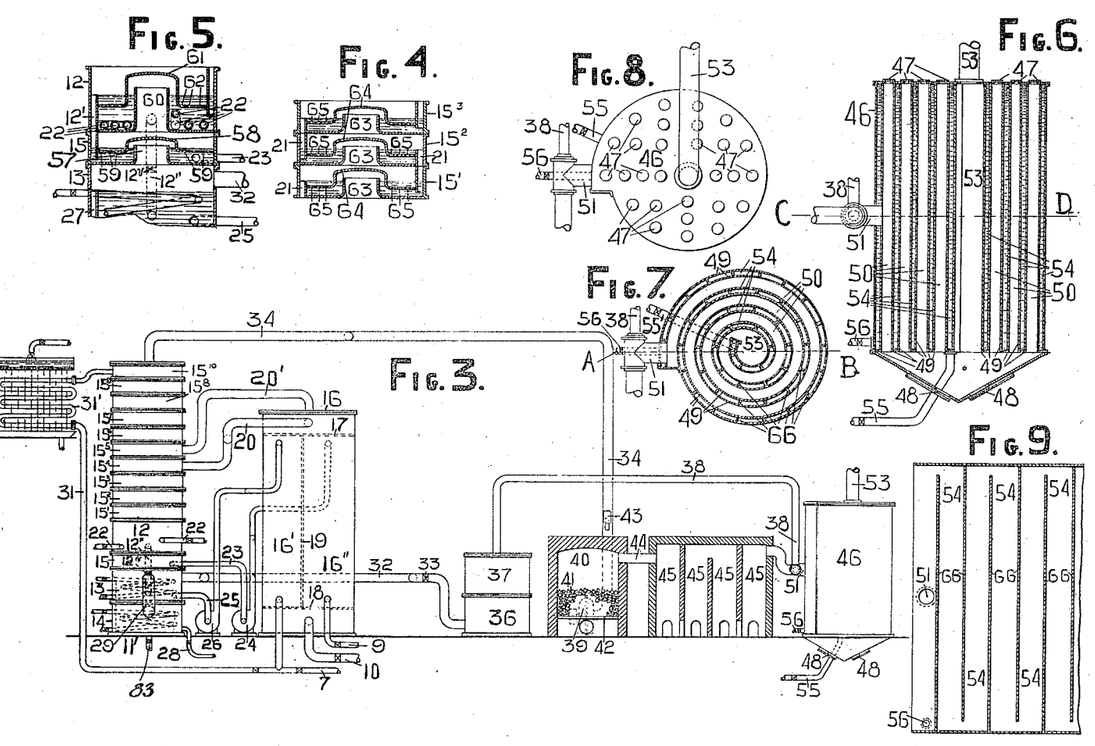

11, is the still in which the impurities removed from the gas are separated from the liquor, and about half of the ammonia in the latter again converted to the free or hydrated condition. 11 has, in its lower portion, three boiling chambers, 12, 13 and 14. Upon the uppermost of these boiling chambers, 12, is built up the still proper. This is composed of a plurality of sections, $15^1$, $15^2$, $15^3$, etc., arranged as shown in Fig. 4.

16 is a heater-cooler or heat interchanger, consisting of a cylindrical tank having an upper and lower tube-sheet (17 and 18, respectively) with tubes supported thereby. The chamber included between the tube sheets is divided by partition 19 into two compartments, 16' and 16''. The liquor passing through pipe 10, which contains the $NH_3$, $H_2S$ and $CO_2$ absorbed from the gas, enters 16 below the tube-sheet 18, and passes up through the tubes (not shown) to the space above the upper tube-sheet, 17. During its upward passage through the tubes, the liquor is heated by two streams of hot liquor passing in the contrary direction through the compartments 16' and 16''. The gases evolved from the liquor, in the course of this heating discharge from 16 through the pipe 20' into one of the sections ($15^5$, as shown) of still 11. The heated liquor from 16 passes through the pipe 20 and enters one of the sections ($15^4$, as shown). From $15^4$ it overflows from section to section through the sealed overflow-passages 21, into the upper boiling compartment 12. As the liquor passes through the sections 15, it is subjected to the action of the hot gases discharging from the compartment 12. Now the ammonia sulfid of the liquor begins to dissociate at about 98° Fah., while the ammonium carbonate dissociates at about 124° Fah. A portion of these gases is therefore evolved from the liquor, even during its passage through 16. During its descent to the boiling chamber 12, the hot gases from 12, which bubble through it, eliminate some more of the $H_2S$ and $CO_2$ from the liquor, at the same time that they give up the larger portion of the $NH_3$ which they carry, to the liquor, since the affinity of the $NH_2$ for the water is much stronger than that of the other gases mentioned. In the heating chamber 12, the liquor is heated to a temperature of from 196° to 206° Fah. by means of the steam coil 22. The temperature maintained in 12 depends upon the temperature of boiling corresponding to the pressure conditions in compartment 12. This depends, of course, upon the altitude of the locality in which the treatment is carried out and upon the back pressure caused by the liquid seals in the compartment. I aim to carry on the distilling operation in 12 at a temperature varying from 6 to 12 degrees below the boiling point of water under the pressure prevailing in 12. For example, if the barometric pressure in 12 is about 25.9 inches of mercury, I would, preferably, maintain the temperature in 12 at about 197° to 198° Fah., while at a barometric pressure of say 31.3 inches in 12, I would, preferably, heat the liquor, therein, at a temperature of about 204° to 206° Fah. At this temperature there is a very rapid dissociation of the ammonium sulfid and carbonate. The liberated $H_2S$ and $CO_2$ are immediately evolved while the greater part of the free ammonia formed is retained in the liquor owing to the relatively great absorption coefficient of water for ammonia at even the temperature prevailing in 12. The liquor discharging from 12 is divided into two streams. The main stream passes through the overflow 12′ into the section 15. Here it has passed through it any excess of ammonia (and its accompanying gases) that is driven off from the liquor in the boiling compartments or retorts 13 and 14, over that portion withdrawn from 13 through the pipe 32. The gases from 13 and 14 are relatively strong in ammonia and the passage of a portion of them through this purified liquor strengthens it and increases its purity. The portion of the gases evolved in 13 and 14 which passes through 15, passes up through the vapor passage 57 in the bottom of 15 under the hood 58, depresses the liquor level under 58 until the perforations 59 are unsealed, up through the perforations 59 and bubbles through the partially purified liquor in 15, thence, the unabsorbed gases, pass in a similar manner through the liquor in 12, and on up through the sections $15^1$, $15^2$, etc. The temperature of this liquor in 15 being only about 198 to 203 degrees Fah. a portion of the ammonia in the gases from 13 is absorbed by the purified liquor, bringing the latter to nearly the saturated condition at this temperature. Since this temperature is far above the dissociation temperature of the sulfid and carbonate of ammonia, and the solubility coefficients of the $H_2S$ and $CO_2$ are practically nil at this temperature, there is practically no contamination of the liquor in 15 by these gases. The liquor, after passing through 12 and 15, will have had about 50 to 60% of its original $H_2S$ and $CO_2$ eliminated with a loss of only about 8% of its ammonia. The residual ammonia is present as free or hydrated ammonia to the extent of about 50 to 60 per cent. of the total. By decreasing the velocity of flow it is possible to increase this proportion of free ammonia but, at the expense of the production of a weaker liquor. Therefore, I have found that the method of working outlined gives the most economical results.

From 15, the main stream of purified liquor is withdrawn through the pipe 23 and is forced by pump 24 to the top of compartment 16″ of heater-cooler 16. The other stream is permitted to pass through the overflow 12‴, in quantity regulated by valve $12_v$, into the boiling compartment, or retort, 13. Here it is subjected to active ebullition, whereby substantially all of the remaining sulfid and carbonate of ammonia is decomposed with the evolution of the ammonia and hydrogen sulfid and carbon dioxid. The ammonia and steam from the liming compartment or retort 14 joins and mixes with the gases evolved in 13. Since the gaseous current from 14 is composed almost entirely of ammonia and water vapor, while the ammonia constitutes nearly one-half of the fixed gases evolved in 13, the gases from these two compartments, after condensation, are very strong in ammonia. Therefore, I prefer to remove from the system its increment in ammonia, at this point. I withdraw from 13, through the pipe 32, the proportion of its vapors which carry a quantity of ammonia corresponding to the ammonia increment of the system, and lead them to the purifiers 36 and 37, which are charged, respectively, with iron oxid and lime. The pipe 32 should be long enough to cool the gases and condense the water vapor present, the condensed liquid being returned to the compartment 13, through the pipe 32, by gravity; or a cooling coil (not shown) may be introduced on 32 between 13 and 36. The gases from 32 pass through the purifiers 36 and 37 and the hydrogen sulfid and carbon dioxid are here separated from the ammonia. The pure ammonia passes through the pipe 38 and joins the treated effluent gases from the still 11 in the condensing apparatus 46. The remainder of the vapors generated in 13 and 14 pass up through 15, 12, 15', etc., as above described. These sections are shown in vertical cross-section in Figs. 4 and 5. The gases from 15 pass up through the vapor passage 60 in the bottom of 12, under the hood 61 through the perforations 62, bubbling up through the liquor in 12, where a further portion of the $NH_3$ of this current is absorbed, thence, with the gases evolved in 12, through the vapor passage 63 and perforations 65 of hood 64 bubbling through the liquor in 15', thence through the sections $15^2$, $15^3$, etc. in the same manner to the top section. These sections $15^4$, etc., are alike in construction. The gases enter each section in turn, through the projecting vapor passage 63 in its bottom passing under the hood 64 and through perforations 65 and into the next section above, as already described. The liquor finds its way down from section to section through the overflows 21.

The boiled liquor discharging from 13 is subdivided into two streams, one being drawn off through the pipe 25 and raised by pump 26 to the top of heater-cooler compartment 16'. The other subdivision of the liquor passes through the overflow 27 into the liming compartment 14. The liquor leaving 13 contains only the fixed salts of ammonia—sulfate, chlorid, etc. The proper quantity of milk of lime is run into 14, through the pipe 28, to combine with the acid of the fixed ammonium salts and liberate the $NH_3$. This passes up through the pipe 29 into the vapor space of 13, and joins the gaseous current discharging from 13. The liquor discharging from 14, which has been freed from all of its ammonia, both volatile and fixed, is permitted to run to waste through the waste pipe 83.

The cooled liquor discharging from compartment 16' is divided into two streams. One of these streams passes directly to the circulating pump of compartment $h$ through the pipe 7, while the smaller stream is conducted to the uppermost section ($15^{10}$ as shown) of the still 11, through the pipe 31 and cooling coil 31'. Overflowing from $15^{10}$ through the sealed overflow passage, it passes into the section $15''$ and thence downward through the different sections, until it joins the main stream of foul liquor, entering through the pipe 20. The unabsorbed gases from 12 and those evolved from the foul liquor are thus contacted with a liquor which, at its entrance to 11, is substantially free from volatile ammonia. This liquor removes from the gases passing through 11 the final traces of their ammonia, and also reabsorbs some of the foul gases. The bulk of these gases ($H_2S$ and $CO_2$) however passes through the still and discharges from the same through the pipe 34, to the fan 39. On the suction pipe of 39 is an air damper, 43, by means of which a regulated proportion of air may be mixed with the effluent gases from still 11. The mixed still gases (which consist principally of $CO_2$ and $H_2S$) and the air admitted through 43, are forced by fan 39 below the grate 42 of the oxid chamber 40. On the grate of 40 is a bed of oxid of iron, 41, or some similar reacting material. This must be raised initially to low redness; but, after the reaction has been started, the heat developed is sufficient to maintain the temperature of the oxid. The net reaction which takes place in the oxidizing chamber may be represented thus, $$2H_2S + O_2 = 2H_2O + S_2.$$

With the proper proportion of $H_2S$ and $O_2$ in the gas mixture this reaction takes place in contact with iron oxid at a red heat almost completely. The actual process which takes place is not according to the equation given, however. The $H_2S$ is first decomposed with the formation of water vapor and iron sulfid. The latter is immediately oxidized again by the oxygen present to oxid which, in turn, reacts with a fresh portion of $H_2S$, the S being liberated as free S. The oxid of iron thus passes through a cycle or, in other words, acts simply as a catalytic agent. Any material which will fulfil the same office such as platinized asbestos may be substituted for the oxid of iron, if preferred. The $CO_2$ of the gas mixture is unchanged. The proportion of air that should be added is that which will supply a volume of oxygen equal to about one-half of the normal volume of the $H_2S$. The gas mixture, after passing through 41, consists, chiefly, of nitrogen, carbon dioxid, sulfur vapor, and steam, with a small proportion of sulfur dioxid. The gases are led through the conduit 44 to the sulfur condensing chambers 45. These may be built of concrete or masonry, and their function is simply to cool the gases from 40 sufficiently to solidify the sulfur vapor and reduce the velocity of the gases sufficiently to permit the sulfur to settle out. If preferred, a centrifugal separator may be substituted for 45. It is only necessary that some device be used which will insure the separation of the sulfur vapor from the gas mixture. From 45 the gases freed from their sulfur pass to the ammonium carbonate condenser 46. Here the gases, which now consist chiefly of carbon dioxid nitrogen and steam, are mixed with the purified ammonia discharging from the pipe 38. In passing through the ammonium carbonate condenser the gases are reduced to at least 100° Fah. Under the conditions obtaining in the condenser 46 the ammonia and water combine with part of the excess of $CO_2$ present to form the so-called sesquicarbonate of ammonia. This crystallizes on the walls of the condenser and may be scraped off by means of suitable rabbles introduced through the openings 47, and withdrawn from 46 through the discharge openings 48 in the bottom of the same. A layer of carbonate, sufficiently deep to seal the bottom of the spiral partition 49 should be maintained in 46 to prevent the passage of the gas from the periphery of 46 to the axial passage of the same, under the partition 49.

The ammonium carbonate condenser consists, simply of a spiral gas passage, 50, formed by the hollow spiral wall 49. The gases enter at the peripheral inlet 51 and discharge from the axial passage 53. Water circulates through the spiral passage 54 in wall 49, entering at 55 and discharging from 56. Baffles 66, shown in Fig. 9, force the water to flow through 54 in a vertical serpentine course, thus insuring that the cooling of the gas takes place with a fair degree of uniformity from the periphery to the axial discharge of 50.

Figure 10:
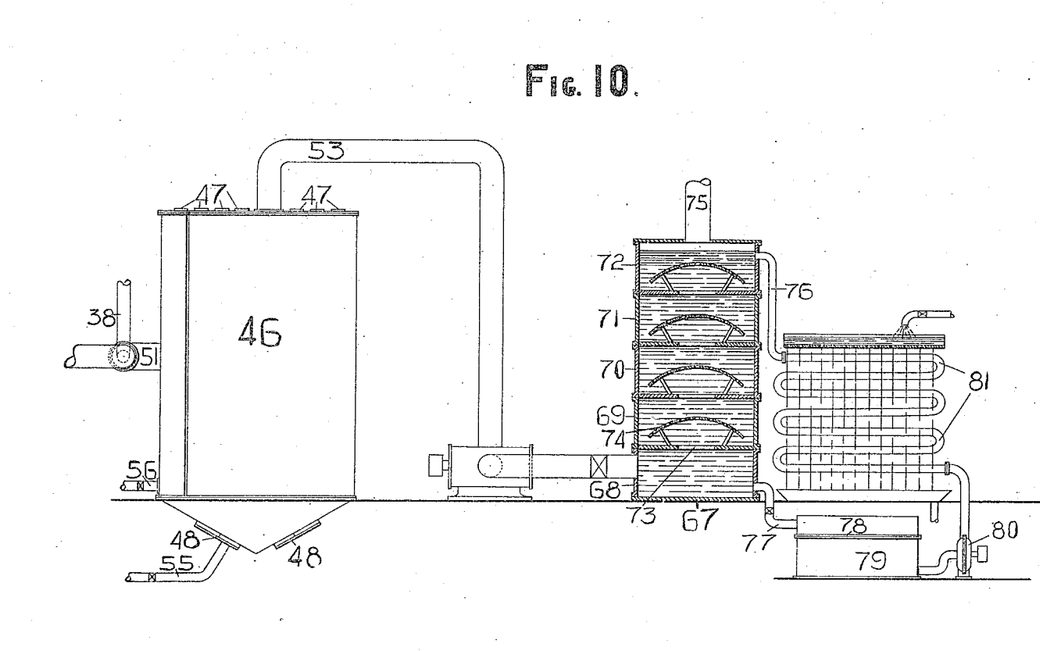
Fig. 10 shows an auxiliary condenser.

I have found that in recovering the carbonated ammonium salt from an excessive volume of diluent gases, it is very difficult to secure a perfect recovery of the ammonium carbonate by dry condensation. Therefore I prefer to subject the effluent gases from the dry condenser 46 to wet condensation in the condenser 67. This, as shown, is an apparatus of a well known type, and any equivalent device may be used instead of this. It consists of a number of superimposed sections, 68, 69, 70, 71, etc. The section 68 is simply an open cylindrical chamber into which the gas is introduced and from which the saturated mother liquor circulated through 67 is withdrawn. The other sections each have a bottom having a large opening, 73, over which is a perforated dome, 74. 74 does not come into contact with the bottom of the section, but there is a clear space between it and the bottom. The gases bubble up through the liquor in the chambers, through the opening into the one above, through the dome-shaped sheet 74, and finally discharge from 67 through the pipe 75. The cooled mother liquor enters 67 from the pipe 76 and gradually works down through 67, taking up any ammonia carbonate in the gases passing through. The liquor being saturated, the ammonia salt immediately crystallizes out. The crystals work down through 67 from section to section and are carried out with the liquor from 68 through the pipe 77, and discharged on the screen 78 of tank 79. The crystals are caught on the fine screen 78 and may be removed at intervals. The liquor is drawn from 79 by the circulating pump 80 and forced through the cooling coil 81 and pipe 76 into the top of 67.

Having described my invention, what I claim is:

1. The process of treating crude gas to recover therefrom commercial ammonium carbonate and free sulfur which comprises separating ammonia, hydrogen sulfid and carbon dioxid from said gas, separating said hydrogen sulfid and carbon dioxid from said ammonia, converting the said hydrogen sulfid to water vapor and free sulfur, separating said free sulfur from residual gases containing water vapor and carbon dioxid, mixing the said separated ammonia with said residual gases to form ammonium carbonate and recovering said ammonium carbonate.

2. The process of making ammonium carbonate and free sulfur from gases containing free ammonia, hydrogen sulfid and carbon dioxid which comprises separating said constituents from said gases, separating hydrogen sulfid and carbon dioxid from said ammonia, mixing with said hydrogen sulfid and carbon dioxid sufficient oxygen to oxidize the hydrogen of said hydrogen sulfid, subjecting the resulting mixture to reaction to form water and free sulfur, separating free sulfur from the residual gases of said mixture, mixing said residual gases with free ammonia to form an ammonium salt of carbonic acid, and recovering the said salt.

3. The process of making ammonium carbonate and free sulfur from gases containing ammonia, hydrogen sulfid and carbon dioxid which comprises separating said constituents from said gases, separating hydrogen sulfid and carbon dioxid from said ammonia, mixing with the said separated hydrogen sulfid and carbon dioxid sufficient oxygen to oxidize the hydrogen of said hydrogen sulfid, subjecting the so-formed gas mixture to reaction to form water and free sulfur, separating free sulfur from residual gases of said mixture containing carbon dioxid and water vapor, mixing said residual gases with the previously separated ammonia, cooling the resulting gaseous mixture containing carbon dioxid, water vapor and ammonia to form a hydrated carbonated salt of ammonia.

4. The process of making ammonium carbonate and free sulfur from gases containing ammonia, carbon dioxid and hydrogen sulfid, which comprises separating said constituents from said gases, separating said hydrogen sulfid and carbon dioxid from said ammonia, mixing with said separated hydrogen sulfid and carbon dioxid sufficient oxygen to oxidize the hydrogen of said hydrogen sulfid, contacting the so-formed gas mixture with a catalytic material which is capable of causing the oxygen of said gas mixture to combine with the hydrogen sulfid of the same, with the formation of water and free sulfur, separating the free sulfur from the residual gases of such gas mixture, mixing the said residual gases with the said separated ammonia and recovering the carbonate of ammonia formed.

5. The process of making carbonate of ammonia and free sulfur from gases containing ammonia, carbon dioxid and hydrogen sulfid which comprises separating said constituents from said gases, separating the said hydrogen sulfid and carbon dioxid from said ammonia, mixing the said separated hydrogen sulfid and carbon dioxid with sufficient air to furnish enough oxygen to oxidize the hydrogen of said hydrogen sulfid, subjecting the so-formed gas mixture to treatment which will cause the oxygen of the mixture to unite with the hydrogen of said hydrogen sulfid, thereby liberating the sulfur of the same, removing the liberated sulfur from the residual gases of said gas mixture, mixing the said residual gases with the said separated ammonia, maintaining the temperature of the resulting mixture below the temperature of dissociation of ammonium sesquicarbonate, whereby the ammonia of said gas mixture combines with more or less of the water and carbon dioxid of the same to form a carbonate of ammonia, and recovering said carbonate of ammonia from the residual gases of said gas mixture.

6. The process of making carbonate of ammonium and free sulfur from gases, containing ammonia, carbon dioxid and hydrogen sulfid, which comprises separating said constituents from said gases, separating said hydrogen sulfid and carbon dioxid from said ammonia, mixing with said separated hydrogen sulfid and carbon dioxid sufficient oxygen to oxidize the hydrogen of the said hydrogen sulfid, contacting the so-formed gas mixture with a metallic oxid which is capable of acting to transfer the oxygen of said gas mixture to the hydrogen of said hydrogen sulfid with the liberation of the sulfur of the same, removing the separated sulfur from the residual gases of said mixture, mixing the said residual gases with the said separated ammonia and cooling the mixture so formed to a temperature below the dissociation temperature of ammonium sesquicarbonate, and separating the so-formed carbonate of ammonia from the residual gases.

7. The process of making carbonate of ammonia and free sulfur from gases containing ammonia, carbon dioxid and hydrogen sulfid, which comprises separating said constituents from said gases, separating the said hydrogen sulfid and carbon dioxid from said ammonia, mixing the said separated hydrogen sulfid and carbon dioxid with sufficient oxygen to oxidize the hydrogen of said hydrogen sulfid, contacting the so-formed gas mixture with oxid of iron at a temperature such that the oxygen of said gas mixture is caused to combine with the hydrogen of said hydrogen sulfid with the liberation of the sulfur of the same, separating the so-liberated sulfur from the residual gases of said gas mixture, mixing the said residual gases with the said separated ammonia, cooling the so-formed gas mixture below the temperature of dissociation of carbonate of ammonium, whereby the ammonia of said mixture is caused to combine with more or less of the carbon dioxid and water of the same to form a carbonate of ammonia, and recovering the same from the residual gases.

8. The process of making ammonium carbonate and free sulfur from gases containing ammonia, carbon dioxid and hydrogen sulfid which comprises separating said constituents from said gases, separating said hydrogen sulfid and carbon dioxid from said ammonia, mixing with the separated hydrogen sulfid and carbon dioxid a proportion of oxygen approximately equal in weight to one-half of the said hydrogen sulfid, contacting the so-formed mixture with catalytic material capable of causing the oxygen of said mixture to unite with the hydrogen of the hydrogen sulfid, liberating the sulfur of the same, separating the so-liberated sulfur from the residual gases of said gas mixture, mixing the separated ammonia with said residual gases, reducing the resulting gas mixture to a temperature below 124° Fah., whereby the ammonia of the gas mixture combines with carbon dioxid and water of the mixture to form a carbonate of ammonia, and separating the so-formed carbonate of ammonia from the residual gases of said mixture.

9. The process of making ammonium carbonate and free sulfur from gases containing ammonia, carbon dioxid and hydrogen sulfid, which comprises separating said constituents from said gases, separating said hydrogen sulfid and carbon dioxid from said ammonia and mixing with the separated hydrogen sulfid and carbon dioxid a proportion of oxygen approximately equal in weight to one-half of the said hydrogen sulfid, contacting the so-formed mixture with oxid of iron at a temperature such that the oxygen of the said mixture is caused to combine with the hydrogen of the said hydrogen sulfid liberating the sulfur of the same, separating the so-liberated sulfur from the residual gases of said mixture, mixing the said residual gases with the said separated ammonia and reducing the temperature of the resulting mixture below 124° Fah., whereby the said ammonia combines with more or less of the carbon dioxid and water vapor of the same to form a carbonate of ammonia, and separating the so-formed carbonate of ammonia from the residual gases.

10. The process of making ammonium carbonate and free sulfur from gases containing ammonia and hydrogen sulfid which comprises separating the said constituents from said gases, separating the said hydrogen sulfid from said ammonia, mixing with said hydrogen sulfid sufficient oxygen to oxidize the hydrogen of the same, contacting the so-formed mixture with a material capable of causing the oxygen of said mixture to combine with the hydrogen of the hydrogen sulfid in the same, thereby liberating the sulfur of the same as free sulfur, recovering said free sulfur, mixing the said separated ammonia with carbon dioxid and water vapor, reducing the temperature of such mixture below 125° Fah. whereby the ammonia of such mixture combines with more or less of the carbon dioxid and water of the same to form carbonate of ammonia.

11. The process of making ammonium carbonate and free sulfur from gases containing ammonia, carbon dioxid and hydrogen sulfid, which comprises, separating the said constituents from said gases, separating said carbon dioxid and hydrogen sulfid from said ammonia, mixing with the separated carbon dioxid and hydrogen sulfid a proportion of oxygen approximately equal to one-half the normal volume of the hydrogen sulfid, contacting the said mixture with oxid of iron maintained at a red heat to form water and free sulfur, cooling the gaseous mixture after the same has been contacted with said iron oxid to condense sulfur, mixing the residual gases containing carbon dioxid and water with said separated ammonia, reducing the temperature of said mixture below 124° Fah. to form a carbonated salt of ammonia and separating said salt from residual gases.

12. The process of recovering ammonium carbonate and free sulfur from crude gas which comprises contacting said crude gas with a liquor containing free ammonia, whereby the ammonia, carbon dioxid and hydrogen sulfid contained in said crude gas are absorbed by said liquor, withdrawing said liquor from contact with said crude gas, subjecting said liquor to heating, whereby a major portion of the hydrogen sulfid and carbon dioxid and a minor portion of the ammonia are evolved from said liquor, subjecting a portion of the heated liquor to boiling to separate therefrom substantially all of its volatizable ammonia, oxidizing the hydrogen sulfid evolved in the heating of said liquor to form water and free sulfur, removing the so-formed free sulfur from the residual gases, mixing the said residual gases with the separated ammonia and cooling the resulting mixture, whereby more or less of the carbon dioxid of said residual combines with the ammonia present to form commercial carbonate of ammonia.

13. The process of recovering ammonium carbonate and free sulfur from crude coal gas which comprises contacting said gas with a liquor containing free ammonia, whereby the ammonia and acid components of the crude gas are absorbed by said liquor to form foul liquor, withdrawing said foul liquor from contact with said gas, subjecting said foul liquor to heating, whereby a major portion of the ammonium salts in said liquor are dissociated with the evolution from said liquor of the major portion of its hydrogen sulfid and carbon dioxid to form purified liquor, cooling the major portion of said purified liquor and using it to scrub the ammonia and acid components from a fresh portion of crude gas, subjecting the minor portion of said purified liquor to boiling to separate, therefrom, substantially all of its ammonia and other volatilizable gases, subdividing the boiled minor portion of said purified liquor into two streams, cooling both of said streams, contacting the cooled liquor of one of these streams with another portion of crude coal gas after the latter has been scrubbed by said purified liquor, contacting the cooled liquor of the second of said streams with the gases evolved in the heating of said foul liquor, whereby any ammonia contained in the gases evolved from said foul liquor is re-absorbed, mingling the said second stream after contacting it with the said gases, with a fresh portion of foul liquor, withdrawing from contact with said second stream the unabsorbed gases evolved from said foul liquor, mixing oxygen with said unabsorbed gases in quantity sufficient to oxidize the hydrogen of the hydrogen sulfid contained in said unabsorbed gases, contacting the so-formed gas mixture wtih a catalytic material capable of acting as a carrier of the oxygen of said mixture to the said hydrogen sulfid, whereby the hydrogen of said hydrogen sulfid is oxidized to water and the sulfur of the same is set free, separating the sulfur set free from the residual gases, mixing the said residual gases with the ammonia separated from the minor portion of said purified liquor, and cooling the mixture, whereby more or less of the carbon dioxid and water of said residual gases is caused to unite with the said ammonia to form a carbonated salt of ammonia.

14. The process of making sulfur and a carbonated salt of ammonium from crude coal gas which comprises contacting said gas with a purified ammoniacal liquor containing free ammonia, whereby the major portion of the ammonia, the carbon dioxid, the hydrogen sulfid, and other impurities of the crude gas, are absorbed by said liquor to form foul liquor, withdrawing said foul liquor from contact with said gas, subjecting said foul liquor to heating by hot purified liquor, further heating said foul liquor at a temperature below the boiling point of said liquor at the pressure at which it is subjected, until a major portion of the ammonium salts of said liquor are dissociated with the elimination from said liquor of the major portion of its acid components and a minor proportion of its ammonia to form purified liquor, cooling the major portion of said purified liquor by a fresh portion of said foul liquor, and using the said cooled major portion of said purified liquor to scrub the major portion of the ammonia and of the hydrogen sulfid from a fresh portion of crude gas, subjecting the minor portion of said purified liquor to boiling to distil off substantially all of its volatilizable gases, withdrawing the distilled gases from contact with said liquor and removing from said gases the major part of their contained hydrogen sulfid and carbon dioxid whereby a relatively pure ammonia is obtained, subjecting a fraction of the boiled minor portion of said purified liquor to boiling with lime, whereby substantially all of its ammonia is eliminated from said fraction, adding said ammonia to the gases distilled off from the boiled minor portion of said purified liquor, cooling the remainder of the said boiled minor portion of said purified liquor, using the major portion of the cooled liquor to scrub the said crude gas after the latter has been scrubbed by said purified liquor, using the minor portion of said boiled and cooled purified liquor to absorb the ammonia from the gases eliminated in the heating of said foul liquor and mingling the said minor portion of boiled and cooled purified liquor with a fresh portion of foul liquor, mixing with the gases evolved from the foul liquor after the ammonia has been removed from the same, enough air to supply sufficient oxygen to oxidize the hydrogen of the hydrogen sulfid in said gases, contacting the resulting gas mixture with oxid of iron maintained below or at a red heat, whereby the said hydrogen sulfid is converted to water and free sulfur; cooling the mixture of gases and sulfur vapor to condense the said sulfur, and separating the condensed sulfur from the residual gases, mixing said residual gases with the said relatively pure ammonia obtained by boiling the minor portion of said purified liquor and cooling the resulting mixture below 124° Fah., whereby the ammonia of said mixture combines with more or less of the carbon dioxid and water of said residual gases to form a carbonated salt of ammonia, and separating the so-formed salt of ammonia from the residual gases of the mixture.

Signed at New York city, in the county of New York and State of New York, this 12th day of February, A. D. 1910.

HENRY L. DOHERTY.

Witnesses:
L. G. COLEMAN,
THOS. I. CARTER.